United States Patent
Cheng et al.

(10) Patent No.: US 11,882,960 B2
(45) Date of Patent: Jan. 30, 2024

(54) COOKWARE FOR SEARING

(71) Applicant: Meyer Intellectual Properties Limited, Hong Kong (CN)

(72) Inventors: Vincent Chi-seng Cheng, Hong Kong (CN); Tanawat Atichat, Bangkok (TH); Kam Yuen Li, Hong Kong (CN)

(73) Assignee: Meyer Intellectual Properties Limited

( * ) Notice: Subject to any disclaimer, the term of this patent is extended or adjusted under 35 U.S.C. 154(b) by 0 days.

(21) Appl. No.: 18/016,252

(22) PCT Filed: Jul. 16, 2021

(86) PCT No.: PCT/IB2021/000545
§ 371 (c)(1),
(2) Date: Jan. 13, 2023

(87) PCT Pub. No.: WO2022/013615
PCT Pub. Date: Jan. 20, 2022

(65) Prior Publication Data
US 2023/0263335 A1    Aug. 24, 2023

Related U.S. Application Data

(60) Provisional application No. 63/052,689, filed on Jul. 16, 2020.

(51) Int. Cl.
*A47J 36/02*   (2006.01)
*A47J 36/04*   (2006.01)
*A47J 37/10*   (2006.01)

(52) U.S. Cl.
CPC ............. *A47J 36/025* (2013.01); *A47J 36/04* (2013.01); *A47J 37/10* (2013.01)

(58) Field of Classification Search
CPC .......... A47J 36/025; A47J 36/04; A47J 36/02; A47J 27/002; A47J 27/00; A47J 37/10; B65D 1/40; Y10S 220/912
(Continued)

(56) References Cited

U.S. PATENT DOCUMENTS 3,419,414 A * 12/1968 Marks .................... B05D 5/086
                                                            220/573.2
3,986,993 A    10/1976 Vassiliou
(Continued)

FOREIGN PATENT DOCUMENTS

| CN | 205994310 U | 3/2017 |
|---|---|---|
| CN | 110403478 A | 11/2019 |

(Continued)

OTHER PUBLICATIONS

International Search Report dated Feb. 7, 2022 issued in connection with PCT/IB2021/000545.
(Continued)

*Primary Examiner* — Robert J Hicks
(74) *Attorney, Agent, or Firm* — Akerman LLP

(57) ABSTRACT

An article of cookware has an interior cooking surface that with raised linear or curvilinear bands with an outer layer of a first material that is one of ceramic or metallic in nature to provide cut and abrasion resistance. Valleys or grooves between the raised bands have an outer layer of a second material with low surface energy to facilitate food release and cleaning of debris. The bands are arranged to protect the second material from cutting and abrasion that would damage the second material. The bands aid in enhancing distribution of cooking oil to enhance searing and browning of foods.

15 Claims, 13 Drawing Sheets

(58) Field of Classification Search
USPC .......... 220/573.2, 573.1, 912, 62.15, 62.11, 220/62.17; 99/447, 324
See application file for complete search history.

(56) References Cited

U.S. PATENT DOCUMENTS

| | | | |
|---|---|---|---|
| 4,118,537 A | 10/1978 | Vary et al. | |
| 4,162,334 A * | 7/1979 | Crandall | A47J 36/04 |
| | | | 426/523 |
| 4,321,177 A | 3/1982 | Wilkinson | |
| 5,144,107 A * | 9/1992 | Peleg | B65D 81/3453 |
| | | | 426/243 |
| 5,691,067 A | 11/1997 | Patel | |
| 6,133,359 A | 10/2000 | Bate et al. | |
| 7,727,637 B2 | 6/2010 | Park | |
| 7,879,449 B2 | 2/2011 | Jeon et al. | |
| 8,741,440 B2 | 6/2014 | Kim | |
| 2008/0118763 A1 * | 5/2008 | Balow | B05D 5/08 |
| | | | 428/332 |
| 2015/0001226 A1 * | 1/2015 | Groll | A47J 37/10 |
| | | | 220/573.1 |
| 2015/0136279 A1 | 5/2015 | Cheng | |
| 2020/0229653 A1 * | 7/2020 | Williams | A47K 3/282 |
| 2020/0237140 A1 * | 7/2020 | Lee | A47J 36/025 |
| 2021/0171269 A1 * | 6/2021 | Johnston | B65D 81/3453 |
| 2021/0219775 A1 * | 7/2021 | Shigenai | A47J 37/10 |

FOREIGN PATENT DOCUMENTS

| | | | |
|---|---|---|---|
| EP | 0799660 A1 | 10/1997 | |
| KR | 1476146 B1 * | 12/2014 | ............ A47J 27/002 |

OTHER PUBLICATIONS

Written Opinion of the International Searching Authority dated Feb. 7, 2022 issued in connection with PCT/IB2021/000545.
International Preliminary Report on Patentability dated Jan. 17, 2023 issued in connection with PCT/IB2021/000545.

* cited by examiner

FIG. 4A
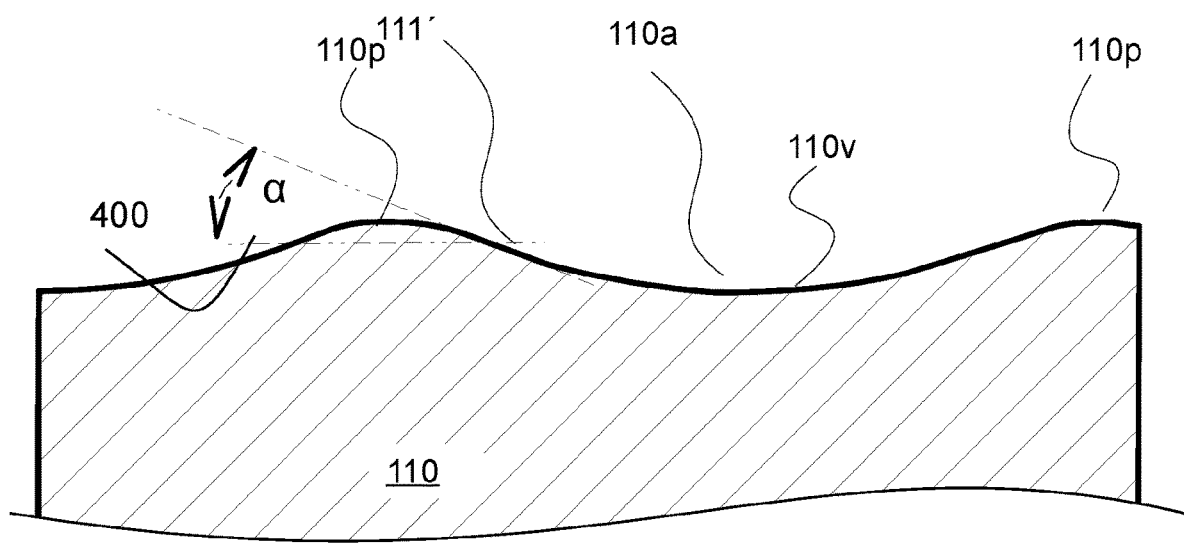
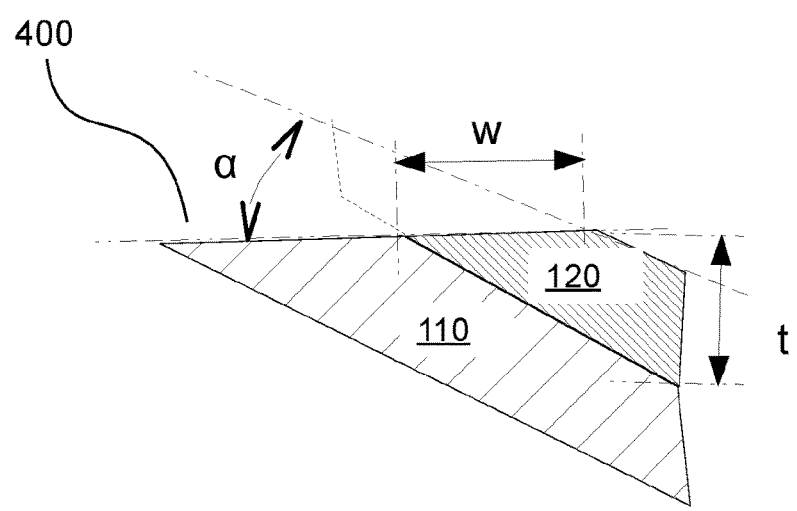
FIG. 4B

COOKWARE FOR SEARING

CROSS-REFERENCE TO RELATED APPLICATIONS

This application is a national phase of PCT/IB2021/000545, filed Jul. 16, 2021, and claims priority to U.S. Provisional Application No. 63/052,689, filed Jul. 16, 2020, the entire contents of both of which are hereby incorporated by reference.

TECHNOLOGY

The present invention relates to cookware, such as sauté, frypans, skillets and other cookware vessel shapes favored for searing meats as well as general purpose use.

BACKGROUND

While non-stick coatings are common on cookware vessels to facilitate clean-up after cooking and allow many foods to be cooked dry, that is, without using any fat or cooking oil in the pan, this is still rarely done for several reasons. First, the cooking oil, even as a thin liquid film, improves heat transfer from the interior bottom of the cookware vessel to the food stuffs. Second, cooking oil adds flavors and absorbs and combines flavors from seasonings and the cooking foodstuffs that are not soluble in water. Third, a very small amount of cooking oil can enhance the release of food from non-stick surfaces that might be oxidized or slightly degraded.

Non-stick surfaces are usually composed of organic compounds, even when filled with very hard ceramic particles, and can still be damaged when cooking utensils of harder materials are used without due caution.

An improvement in non-stick cookware has been made by configuring the cooking surface to have various patterns of stronger metal that protrude slightly from the non-stick surface. The metal portions act as spans to support utensils to limit the potential for direct contact with the non-stick surfaces between them. However, for the aforementioned reasons it is still desirable to use some amount of fat or cooking oil.

As fat and cooking oils are calorie dense and may contribute to obesity when they exceed reasonable dietary consumption levels, it would be desirable to obtain the culinary benefits of using fats and oils at the minimum amount necessary.

It has been suggested that brushing food with a thin layer of cooking oil before cooking is sufficient. However, when the food hits the hot pan, the cooking oil needs to reach the cooking temperature, and this delays and may impede the development of a dark and flavorful crust on protein rich foods, such as eggs and animal proteins.

It is also problematic to keep a thin film of cooking oil well distributed in a cookware vessel. The vessels are usually shaped to crown at the center, being convex to provide an exterior annular about the bottom to make them stable on flat surfaces. Further, even with flat bottom cookware, the cooking oil rarely will remain as a thin uniform film. As the cooking oil heats it decreases in viscosity and surface tension. This causes the oil to flow away from the hottest region of the cookware, the center portion which is directly over the heat source. Consequently, some cooks use considerable amounts of cooking oil to overcome these factors.

It is therefore a first object of the present invention to provide a cookware vessel that is easy to clean, having a non-stick coating on at least some portions of the interior surface.

It would also be desirable that the non-stick surface is protected from damage by metal utensils.

It would also be desirable to reduce the amount of cooking oil that is needed in such a pan to sear certain foods.

Accordingly, it is another object of the invention to provide cookware that provides such benefits and improvements without compromise.

SUMMARY

In one embodiment, an object of the present invention is achieved by providing an article of cookware having a surface for supporting foodstuffs during cooking. The surface comprises a first region defined by a plurality of planar bands of a first material that are spaced apart from each other by at least a first distance. A second region is defined by a plurality of intervening channels between the planar bands in which the intervening channels have surfaces that are disposed below an upper surface of immediately adjacent planar bands and have an outer surface of a second material with a lower surface energy than an outer surface of the first region.

An aspect is characterized such an article of cookware wherein the first material is one of a metal, a metal alloy, a metal compound, and a ceramic compound.

Another aspect is characterized by any such article of cookware wherein the second material is a non-stick coating that comprises one of fluoro-polymers, silicones and fluoro-silicones. A further aspect is characterized by any such article of cookware wherein the non-stick coating comprises one of fluoro-polymers, silicones and fluoro-silicones.

Another aspect is characterized by any such article of cookware wherein the surface of the intervening channels have curvilinear shape transverse to a principal axis of the planar bands of the first region.

Another aspect is characterized by any such article of cookware further comprising a third region defined by a plurality of intervening surface between each of the first regions and second regions which comprises intervening planar bands disposed at about the same height as the planar bands of the first region in which the outer surface of the intervening planar bands comprises the second material.

Another aspect is characterized by any such article of cookware wherein the intervening planar bands are narrower than the planar bands of the first region.

Another aspect is characterized by any such article of cookware wherein the planar bands of the first region have a width of at least about 2.5 to 4.5 mm.

Another aspect is characterized by any such article of cookware wherein the intervening channels have a width of at least about 0.5 to 2 mm.

Another aspect is characterized by any such article of cookware wherein the planar bands have an elongated curvilinear shape.

Another aspect is characterized by any such article of cookware that further comprises an upward extending sidewall that surrounds the surface for supporting foodstuffs.

Another aspect is characterized by any such article of cookware wherein the planar bands have an elongated curvilinear shape and are circular, each planar band forming a concentrically aligned annular ring with respect to the other planar bands in the plurality.

Another aspect is characterized by any such article of cookware in which the article of cookware has a base material and the surface for supporting foods stuffs is above the base material.

Another aspect is characterized by any such article of cookware in which base material is selected from the group consisting of aluminum, stainless steel, cast iron and ceramic materials.

Another aspect is characterized by any such article of cookware wherein the intervening surfaces are disposed slightly lower than an upper surface of immediately adjacent bands have a convex shape.

In another embodiment, an object of the present invention is achieved by a process characterized by forming an article of cookware comprising the steps of forming a substrate having an upper surface with periodic undulating variations in height in a first direction in which the highest regions of the surface extend continuously in a second direction by an amount that is 5 times greater than a spacing between adjacent but unconnected highest regions, depositing one of more layers of a conforming coating as a fluid over upper surface, curing the fluid to form a solid surface covering the upper surface, abrasively removing a portion of the solid surface that cover the highest regions of the upper surface to remove an upper portion of the substrate from the highest regions of the surface to form a plurality of elongated planar surfaces that extend continuously in the second region and expose a material that formed the upper surface of the substrate, wherein each planar surface is surround by a planar region of the solid surface.

Another aspect is such a process for forming an article of cookware wherein the solid surface has a lower surface energy than the highest regions of the surface that remain after said step of abrasively removing.

Another aspect is any such process for forming an article of cookware further comprising the step of providing an adhesion layer on the upper surface before said step of depositing one of more layers of a conforming coating as a fluid over the upper surface to coat the adhesion layer.

Another aspect is any such process for forming an article of cookware wherein the adhesion layer is provided by a step of roughening the upper surface.

Another aspect is any such process for forming an article of cookware wherein the adhesion layer is provided by a step of depositing an additional layer on the upper surface.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a top plan view of a center and adjacent s of a cookware vessel in accordance with a first embodiment of the invention, whereas

FIG. 2A is an enlarged view of the highlighted region in FIG. 1B, whereas

FIGS. 4A and 4B are schematic cross-sectional elevation view of portion of the vessel bottom interior during steps in the process of FIG. 3.

FIG. 8A is a schematic top plan view of an additional embodiment of the invention, whereas

FIG. 9A is a schematic top plan view of an additional embodiment of the invention, whereas

FIG. 10A is a schematic top plan view of an additional embodiment of the invention, whereas

FIG. 11A is a schematic top plan view of an additional embodiment of the invention, whereas FIG. 11B is a section view thereof.

DETAILED DESCRIPTION

Figure 1A:
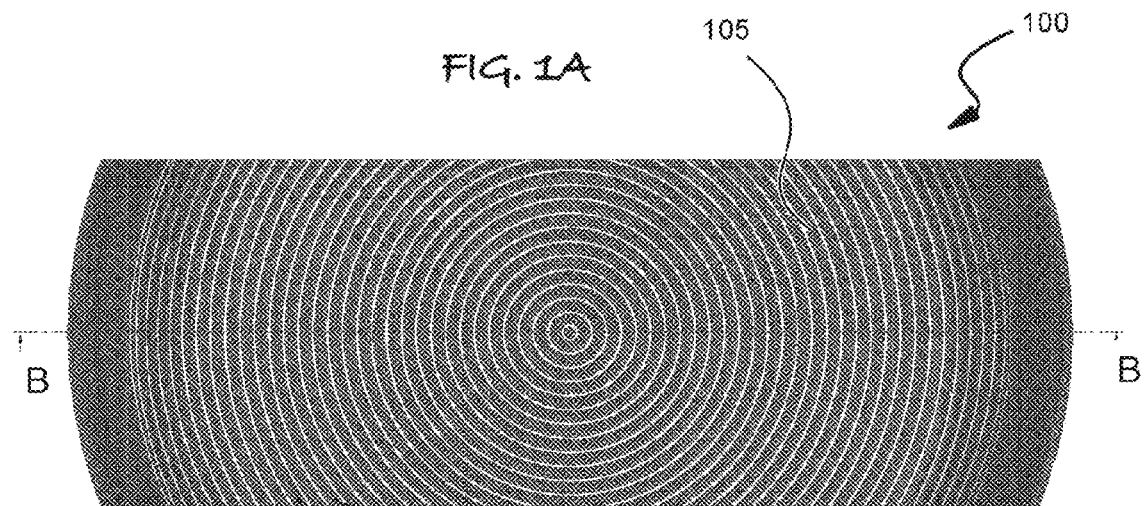
Figure 1B:
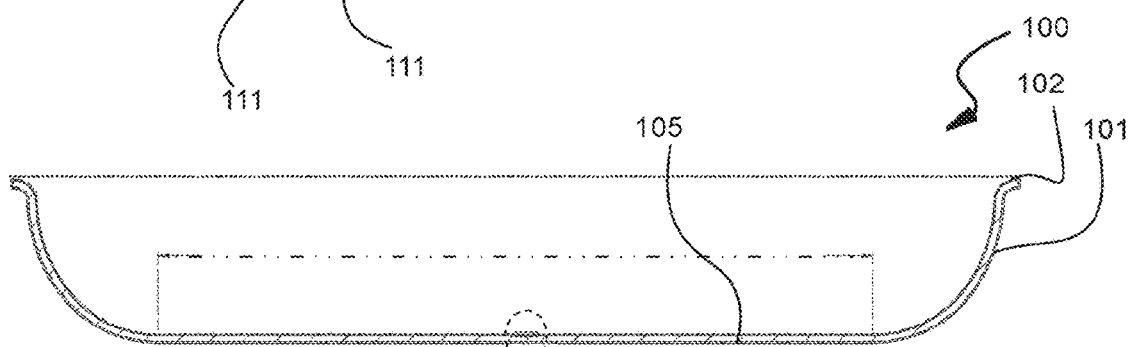
FIG. 1B is a cross sectional elevation view thereof.

Referring to FIGS. 1A through 13B wherein like reference numerals refer to like components in the various views, there is illustrated therein a new and improved cookware for searing, generally denominated 100 herein.

In accordance with a first embodiment of the present invention, the cookware vessel 100 for searing has a generally horizontal interior bottom 105 for supporting foods stuffs during cooking.

The cookware vessel 100 also optionally has upward extending sidewalls 101 that surround the perimeter of the interior bottom 105, the sidewalls 101 terminating at a rim 102. The vessel 100 is generally formed of a substrate material 110, but the substrate material can have a clad structure distal from the food supporting upper surface of the interior bottom 105 as well as various coatings and layers as further described herein. The interior bottom 105 has a first region defined by a plurality of substantially planar bands 111 of a first material that are spaced apart from each other by at least a first distance. A plurality of intervening surfaces 113 between the bands 111 define a second region. The intervening surfaces 113 are disposed slightly lower than an upper surface 111a of immediately adjacent planar bands 111. The intervening surfaces 113 are of a second material with a lower surface energy than an outer surface of the first region in which the first material is harder than the second material.

The invention may be implement with different shapes of the planar bands 111. The planar bands 111 should be understood to be elongated members with a high aspect ratio, generally at least about 10:1. The bands can be linear, curvilinear and combinations of curvilinear and linear segments. The bands 111 can change shape across the interior bottom 105. Planar should not be interpreted to mean absolutely planar or that all the bands are co-planar with each other. As the bands 111 are exposed by an abrasion process the degree of planarity is relative to the shaping tool and process, as in some embodiments they bands my in fact for surface of revolution about a very low aspect ration cone, or a substantially similar shape. Rather, planar bands should be understood to be such surface that are continuous over an aspect ratio of length to width of at least 5:1, or more preferably over 10:1 with smooth transition in shape over these regions.

In a preferred embodiment illustrated in FIG. 1A, the bottom surface 105 has concentric rings that expose a metal surface 111a of the planar bands 111. Between these planar bands 111 the remainder of the interior bottom 105 has intervening surface 113 that also form concentric intervening ring, but in cross-section are shaped like troughs, channels or valleys, which may be used interchangeably, that are covered by a non-stick coating 120 with an exposed upper surface region designated 121a.

The term non-stick coating is intended to embrace a layer of material or materials with a lower surface energy than the surface they are placed on and intended to embrace organic coating, inorganic coatings, including coatings with inorganic fillers, which in the case of organic coatings may be bonded to the inorganic fillers, and are thus intended to embrace all manner of fluoro-polymer based coatings in which fluoro-polymer is the organic components inherently having a low surface energy. Various U.S. patents teach compositions of matter and methods of applying organic based and non-stick coatings to cookware vessels. These include U.S. Pat. No. 3,986,993 to Vassiliou (issued Oct. 19, 1976); U.S. Pat. No. 4,118,537 to Vary, et al. (issued Oct. 3, 1978); U.S. Pat. No. 4,321,177 to Wilkinson (issued Mar. 23, 1982); U.S. Pat. No. 5,691,067 to Patel (issued Oct. 25, 1997) and U.S. Pat. No. 6,133,359 to Bate, et al. (issued Oct. 17, 2000), all of which are incorporated herein by reference. Such non-stick coating typically contain one or more low surface energy polymers of resin, particularly fluorinated resins or fluorinated silicone resins, and silicone resins, including, PTFE (polytetrafluoroethylene), FEP (fluorinated ethylene propylene), PFA (Perfluoroalkoxy) and combinations thereof, along with reinforcing fillers such as glass, aluminum oxide, silicon dioxide, titanium oxide, silicon carbide, and the like, and are preferably deposited as multilayer coatings with varying compositions so the outer surface though softer, is more chemically inert and water and oil repellent. The composition may also include one or more binder resins such as polyamide-imide (PAI), polyphenylene sulphide (PPS), polyether sulphone (PES), polyaryletherketone or a silicone and possibly also pigments.

The term non-stick coatings is also intended to embrace coatings containing or formed as a reaction product of silicone polymers and/or flourosilicone polymers, oligomers thereof, as well as coupling agents such as silanes and organo-silanes which are optionally bonded to hydroxy groups on the surface of inorganic particles like pigments and reinforcing fillers, such as alumina, silica or mica, such as disclosed in the following US Patents that are incorporated herein by reference: U.S. Pat. Nos. 7,727,637 B2, 7,879,449 B2, and 8,741,440 B2.

In accordance with another embodiment of the present invention, the cookware vessel 100 has the portions between the exposed metal surface 111a and the troughs or channel of the intervening surfaces 113 covered by the non-stick coating 120 that are substantially planar surfaces 112, that are also covered by portion non-stick coating that forms surface 121a.

In accordance with another embodiment of the present invention, the cookware vessel 100, the troughs or channel of the intervening surface 113 have a pitch, P, and depth or height, H, that may improve aspects of cooking performance.

In accordance with another embodiment of the present invention, the cookware vessel 100, the exposed metal surface 111a have a preferred width, W, to provide both protection of the non-stick surfaces 121a and 120 of the troughs of the intervening surface 113 that also enhances the cooking process and achieves additional objectives as describe further below.

Figure 3:
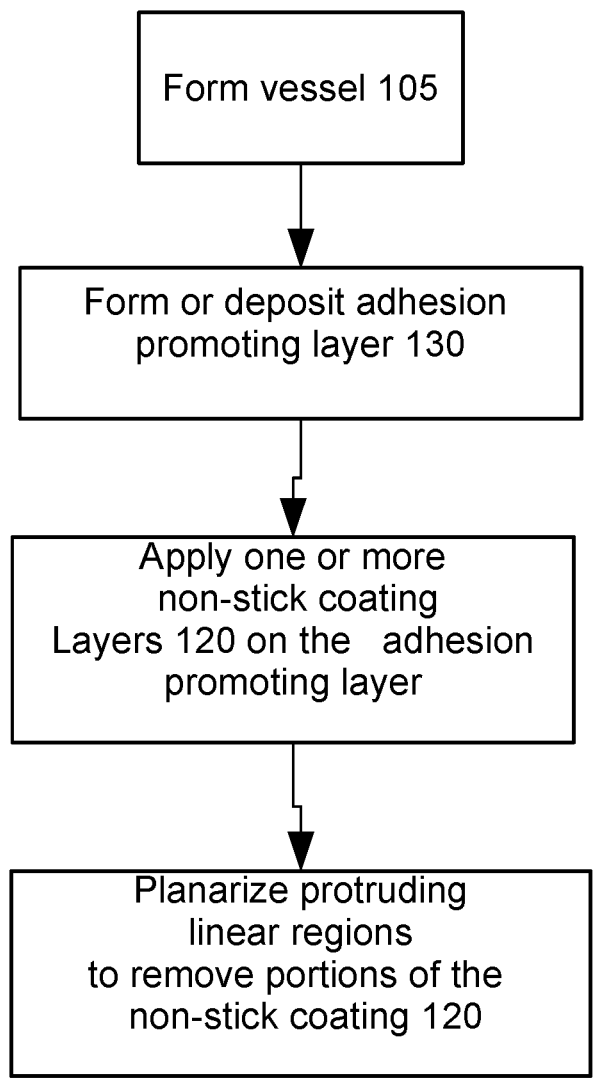
FIG. 3 is a flow chart of a process for forming different embodiments.

Another aspect of the invention is a process for making cookware with the inventive surface features, which is illustrates as a flow chart in FIG. 3. The first step is forming the general shape of the cookware vessel 100 from the substrate material 110, as shown in FIG. 4A. The interior upper surface 110a for supporting foods stuffs during cooking has an undulating structure of peaks 110p separated valleys 110v. Region surrounding the peaks 110p are converted to the planar bands 111 by a process of removing material to the broken line labeled 111'. However, before this removal process the entire surface 110a is covered with a non-stick coating layer 120, which is removed in the region of line 111', to planarize the peak regions 110p, and any additional conforming layers deposited thereon.

The surface 110a can be formed by casting or coining processes, that is stamping the surface texture via a complimentary tool or die. The coining process can be performed before or after a vessel 100 with sidewalls 101 is formed by deep drawing planar sheets of metal or clad metal composites. The coining process can be combined with the process of deep drawing planar sheets, in that an inner surface of the forming die can have the complimentary surface texture.

In more preferred embodiments, depending of the nature of material 110 that forms the cookware vessel 100, different types of adhesion promoting surfaces or layers 130 are formed from or on surface 110 having the desired texture undulating shape. To the extent the cookware vessel is formed with a surface that inherent provides the roughness of chemical reactivity to provide the function of the adhesion promoting layer 130, it is optional.

The adhesion promoting layer's 130 purpose is to improve the bonding of the non-stick coating 120 deposited in the next step. Some non-stick coatings require a rough substrate to provide sufficient adhesion for use in cookware. Thus, forming an adhesion layer 130 may embrace such processes as arc or plasma spraying metal and/or ceramic coatings, abrasive roughening, such as sand blasting, etching and forming conversion coatings. Conversion coating is meant to embrace oxidizing, such as hard anodizing aluminum to create a rough and porous alumina surface in the case of material 110 being aluminum or an alloy thereof. In the case of the material 110 being a ferrous material, such as cast iron or a steel, nitriding processes and carbo-nitriding processes may be used to form a metal carbide, metal nitride or metal carbo-nitride conversion coating as the adhesion promoting layer 130. Such conversion coatings are known to be rough and porous and enhance the adhesion of non-stick coatings 120.

The adhesion promoting layer 130 can be formed by abrading or sand blasting interior upper surface 110a. Likewise, plasma arc spraying of metal, ceramics and cermets may be used to deposit the adhesion promoting layer 130 on the interior upper surface 110a. The adhesion promoting layer 130 can also be a as little as a monolayer of a chemical compound(s) that bonds interior upper surface 110a. to the first monolayer(s) of the non-stick coatings 120.

Then, one or more non-stick layers 120 are deposited on the adhesion promoting layer 130. As non-stick coating layers 120 are generally at least partially organic materials, such as dispersion of flouro-polymers and ceramics in a fluid carrier, or sol gel solutions or dispersion, they can be spray, painted, or deposited on the adhesion promoting layer by curtain coating.

Figure 2A:
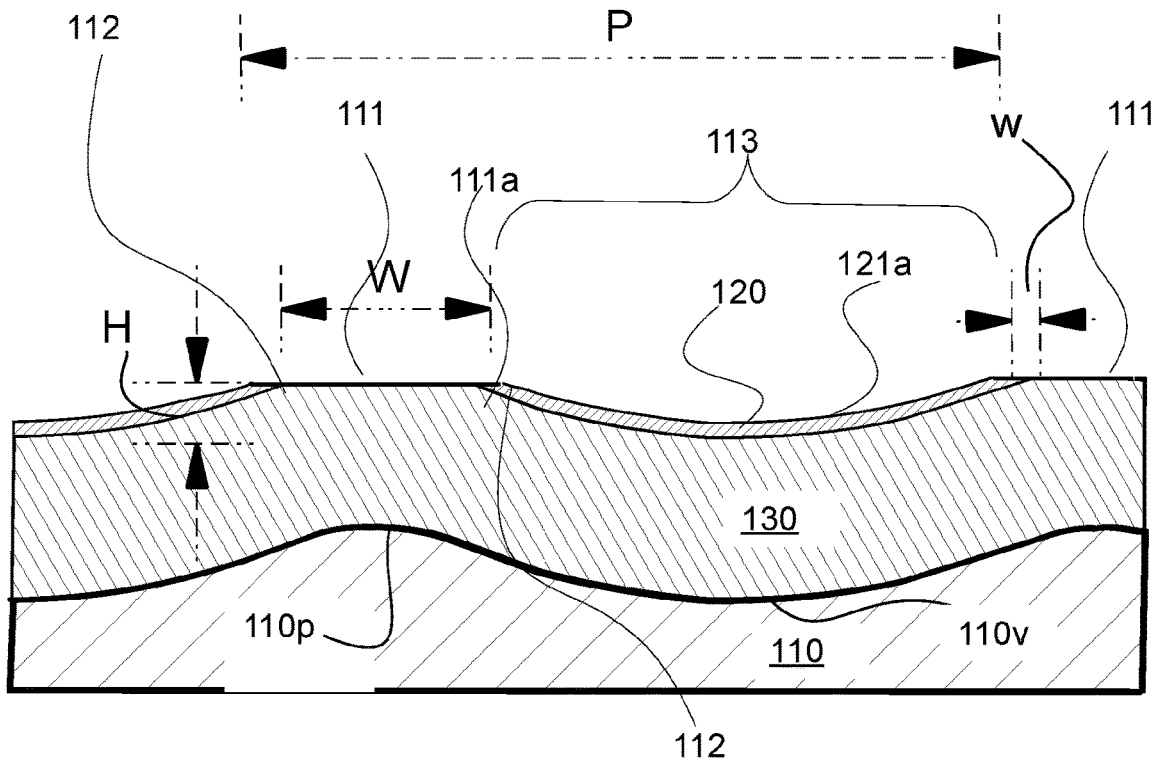
Figure 2B:
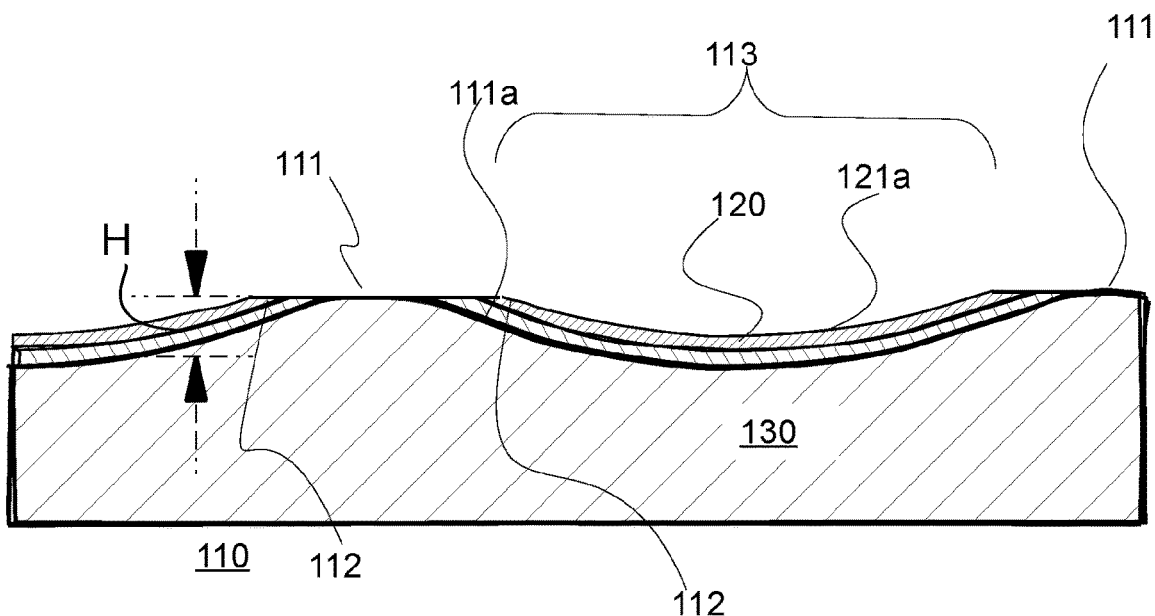
FIG. 2B is an enlarged view of an alternative embodiment of the highlighted region in FIG. 1B

To the extent the adhesion promoting layer 130 improves some aspect of cooking performance, or it is not desired for food to contact layer 110 or the core of the cookware, the removal may be only a portion of the adhesion promoting layer 130, so it forms a food contact surface, such as shown in FIG. 2A. FIG. 2B shows the alternative of a very thin adhesion promoting layer 130 that is removed completely in the region of the bands 111, so the top or outer surface of the bands 111a is he substrate material 130.

Such fluid deposition processes to deposit the adhesion layer 130 and/or the non-stick coating 120 may fill the troughs and cover the ridges with the non-stick precursor 120'. However, the texture is sufficiently deep relative to the mass of non-stick coating being deposited that as the fluid carrier dries and/or cures as the non-stick coating consolidates, the height of the coating in the troughs remains below that of the original height of the ridges.

The non-stick precursor 120' is fully dried, cured, reacted and/or hardened the final step in the process is planarizing with abrasive material to form the planar bands 111 from the material 110.

When the abrasive materials may be applied under the force of rotary planar movement of an abrasive carrier or support to wears down the non-stick coating 120 and at least a part of the adhesion layer to form planar bands 111.

Depending on the natural of the adhesion promoting layer, it may be desirable to partial or totally remove it to expose narrow bands of the underlying metal substrate.

Figure 6:
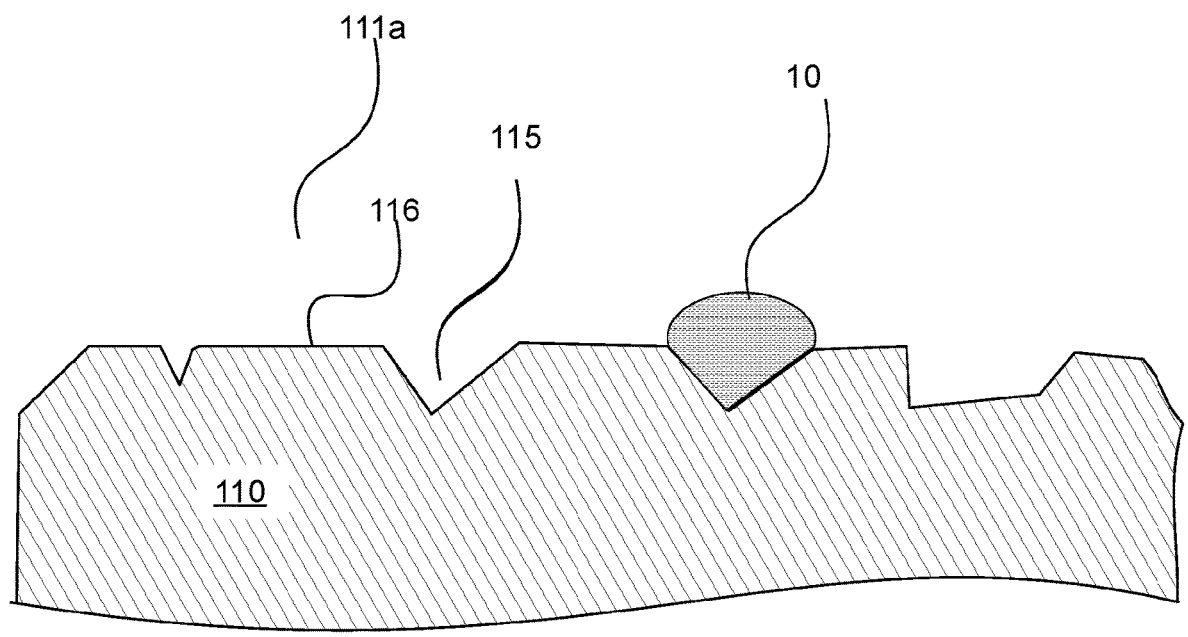
FIG. 6 is an expanded cross-sectional view of a portion of the cookware vessel interior bottom surface corresponding to the section line in FIG. 5B.

It is believed aspects of the cooking performance may be enhanced by the micro-structure in the planar bands 111, specifically as illustrated in FIG. 6 by the grooves 115 formed between flat regions 116 by the larger abrasive particles or a simply rough surface from the wearing away of the material 110. The scale of FIG. 6, while not absolute, is greatly enlarged compared to the other cross-section views to show the potentially roughness in the upper surface of the planar region 111. The grooves 115 may retain droplets of oil 10 that are repelled from the non-stick coating layer 120 that remains on the interior region 105.

It has been observed that in testing various embodiment of the invention, a miniscule amount of oil can be used in cooking, but that food will still quickly sear on the region that contact the planar bands 111. However, it is possible that the retained oil 10 in the grooves 115 is sufficient to prohibit sticking yet allow the food to brown quickly. The rapid browning and searing is believed to occur because the metal on the planar bands 111 gets somewhat hotter than the surrounding non-sick layer 120. The slightly higher temperature of the exposed meal in bands 111 has been confirmed using small contact thermal probes were used to measure the difference in temperature between the bottom of the grooves covered with the nonstick coating the top of the peaks in which the metal was exposed. Pans with a diameter of roughly 11 inches were heated on the induction burner base to raise the temperature above 200° C. Due to the small size of the induction coil's, the center of a pan will heat faster than the edges. Hence measurements were made at the center by placing a thermal probe on the non-stick coating, and comparing it with the thermal probe placed on the closest metal ring. Measurements were also made at the closest ring and groove to the midpoint between the center and the perimeter of the pan, that is one quarter the diameter. The temperature increases for the mid-point and the pan center are compared in FIGS. 13A and 13B respectively to show the relative increase in temperature. Center measurements show the nonstick coating is roughly 3°-4° C. warmer by the time the pan reaches about 210° C. However at the midpoint, nonstick coating is significantly cooler, as the exposed metal of the closest peak at the same instant will reach a temperature of between about 177-189° C. At the same instant, the closest trough covered with the nonstick coating will be about 9 to 14° lower in temperature.

When the planarizing process remove and flattens the top of the peaks in the metal base it also flattens narrow adjacent bands 112 of the non-stick coating 120. The width of these narrow bands depends on the slope of the curvilinear base at the plateau formed in the planarizing process per the as in FIG. 4A. FIG. 4B illustrates angle α between the line 400 tangent to the undulating surface 110a at the intersection with line 111'. The width, w, of the narrower adjacent n=bands 112 is t/tan α.

The depth and pitch of the peaks in the metal base can be optimized to vary the width of the bands as well as well as the plateau width to optimize the cooking performance with low residue of cooking oils. Not wishing to be bound by theory, the low surface tension of the non-stick coating presents an interface that repeals the cooking oil from migration, and retains a sufficient but small residue of oil to minimize food adhesion and promote browning. The slight roughness from grooves 115 formed in the surface 111a/116 from the abrasive used in the planarizing process may also aid in the retention of the cooking oils 10.

Preferred dimensions of the bands that define the planar regions 111 and the troughs 120 to enhance food release in cooking many types of foods are height (H) or depth of about 0.15 mm and a pitch (P) of about 3 to 6 mm, but more preferably about 4 mm, with the width (W) of the troughs 113 between bands 111 being between about 0.5 to 6 mm. The width, w, or the narrower band 112, if present is typically about 0.005 mm to about 0.5 mm. The planar bands 111 of the first region may have a width of at least about 0.5 to 2 mm, are preferably narrower than the width W of the troughs.

Not wishing to be bound by theory, it is presently believed that several factors may improve the release of cooked foods from the planar region or bands 111, such as narrow widths W thereof from fractions of a mm to several mm, as well as the adjacent narrow bands 112 of the remaining non-stick coating layer. It is also believe that as the total relative width of the non-stick regions is W+w, which shall be as referred to NSW, is comparable to the width of the planar regions 111 transverse to the longer axis of the associated bands which equals P−W−w, aids in the release of cooked foods stuffs with the desirable crisp browned layer produced by searing in contact with the bands 111 intact. As the adjacent region of cooked food stuff that is not adhered to the cooking surface (over portions of width NSW) can flex sufficiently when urged forward by a tool or implement that it provides a local force to initiate peel away of connected foodstuff that is slightly adhered to the planar region 111. As the food stuff then starts to peel away, this assistive local force may propagate down the length or long axis of the bands 111, permitted a pleasantly browned crust formed on searing the food stuff to largely remain intact on the food. Any food stuff remaining adhered to the metal or ceramic surface of the bands 111 is easily wiped off with a damp sponge or paper towels.

The planar bands 111 protect the recessed non-stick layer from damage with a spatula or other kitchen utensils, being essentially continuous bands. This allows consumer to use metal utensils of all manner on the interior cooking surface, as well as cook through food at the time of serving. Continuous planar bands 111 do not generate resistive friction to a spatula moving over them to lift food, and are more gentler on the food and avoid the scraping sounds observed when a metal spatula is rubbed over discrete raised metal portions.

Figure 5A:
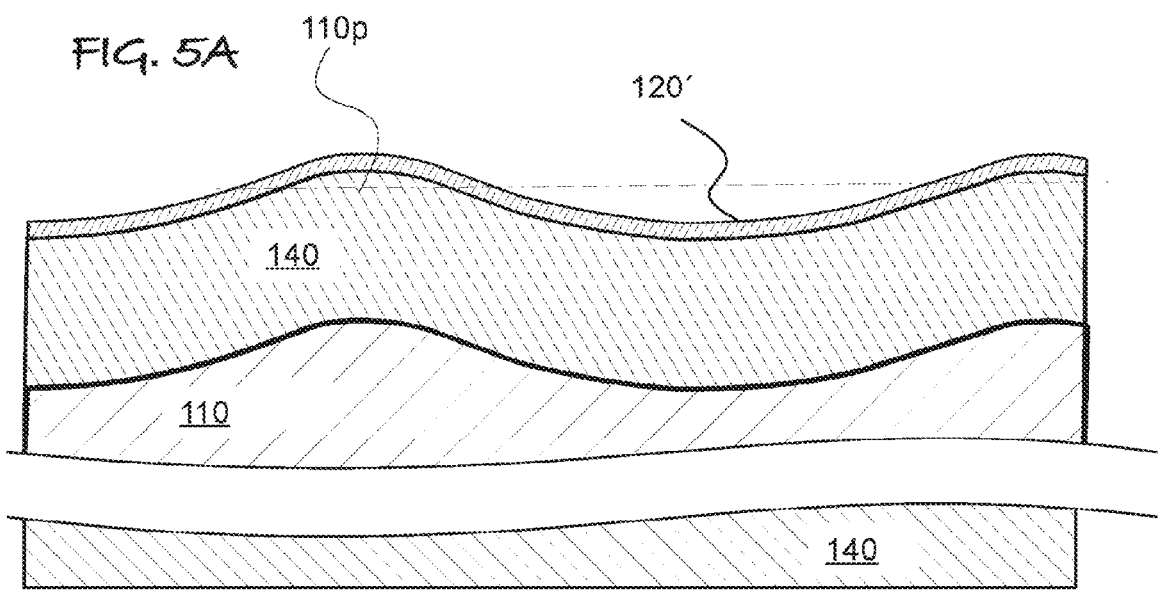
FIGS. 5A and 5B are schematic cross-sectional elevation view of portion of the vessel bottom interior during steps in the process of FIG. 3.
Figure 5B:
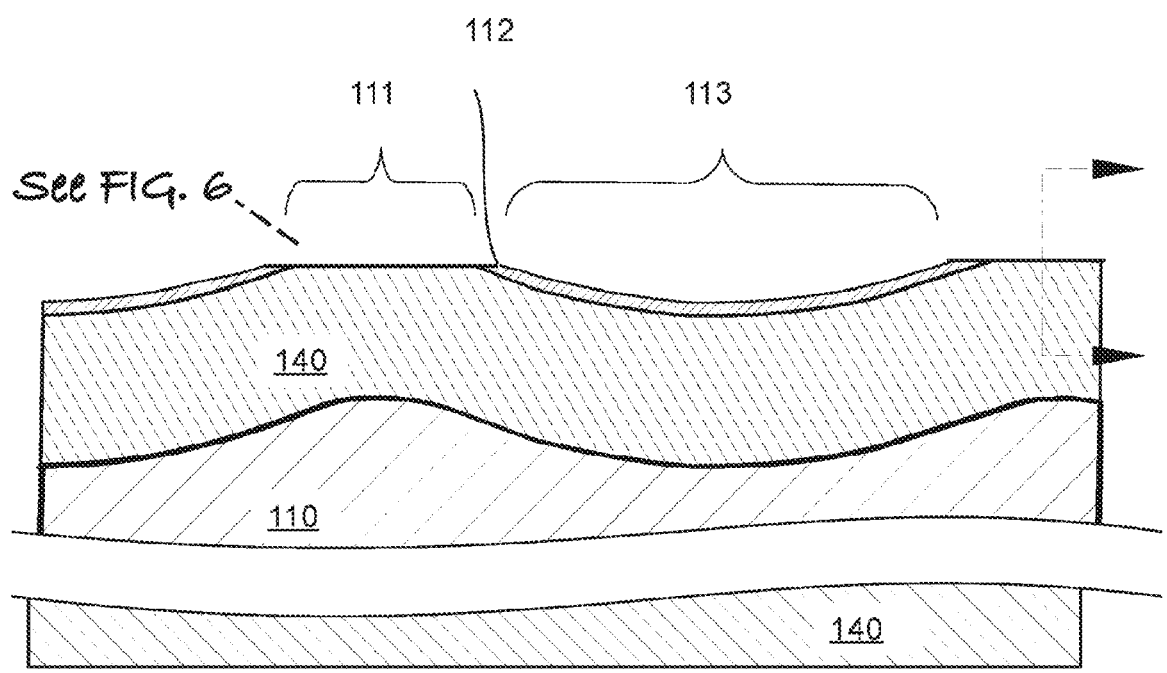

FIGS. 5A and 5B are schematic cross-sectional elevation view of portion of the vessel bottom interior during steps in the process of FIG. 3. The vessel 100 has a clad construction with an aluminum core 110 coved by a clad layer of stainless steel 140. The adhesion layer 130 is not shown, as it is created by grit blasting the upper surface of the stainless steel layer before applying the non-stick coating 120.

Figure 7A:
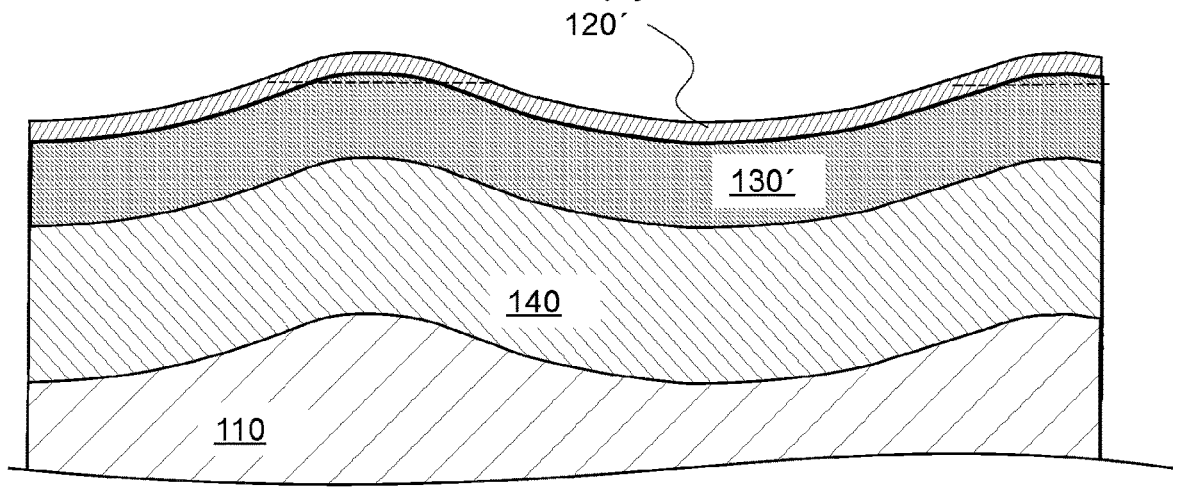
FIGS. 7A and 7B are schematic cross-sectional elevation views of portion of the vessel bottom interior in another embodiment of the invention, during steps in the process of FIG. 3.
Figure 7B:
Figure 7B:
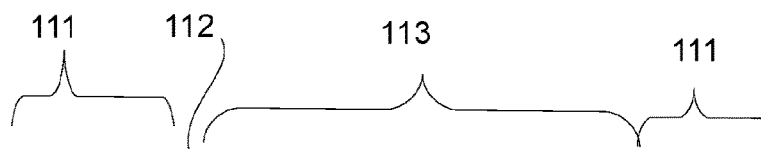
Figure 7B:
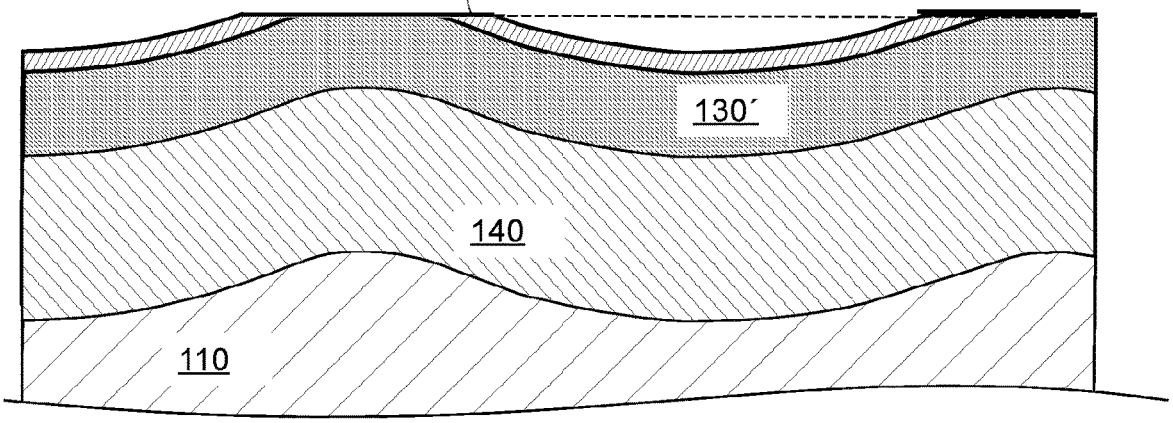
Figure 7B:

FIGS. 7A and 7B illustrate another embodiment of the invention is which a vessel 100 has a clad construction with an aluminum core 110 coved by a clad layer of stainless steel 140. After the vessel is formed, the stainless steel layer is covered with one or more layers of a ceramic material 130'. The ceramic material 130' is in turn coated with a non-stick coating 120.

The partial removal of the non-sick coating results in the ceramic material 130' exposed at bands 111. The ceramic material 130' may be applied by arc or plasma spraying ceramic powers, conversion coating or PVD coating of oxides, nitrides, and carbo-nitrides to provide a porous surface that will strongly adhere the non-stick coating 120. As ceramics are harder and more wears resistant than metal such surface may be more durable when exposed to repeated contact with cooking tool and implements. Further, many ceramics have lower surface than metals, providing better release of cooked food particle to stir or flip food, as well as remove it for serving.

Figure 8A:
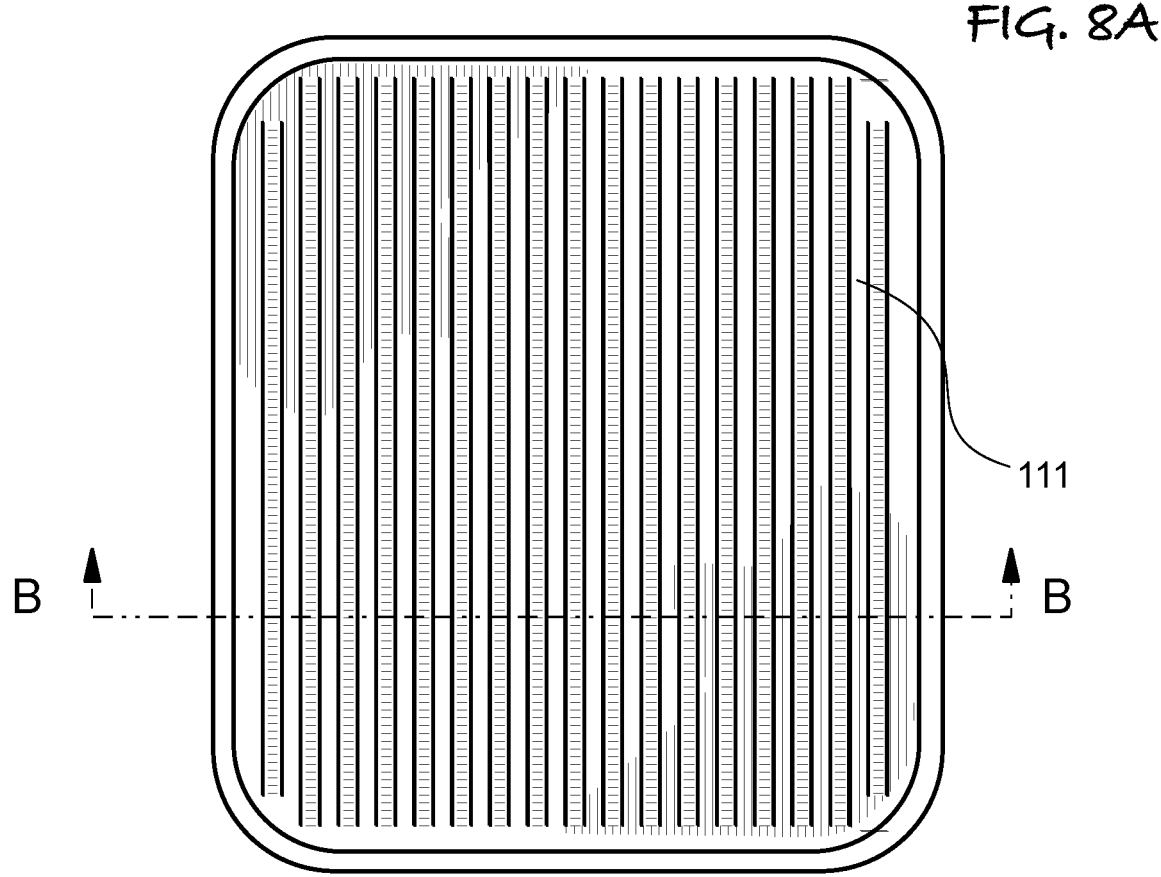
Figure 8B:
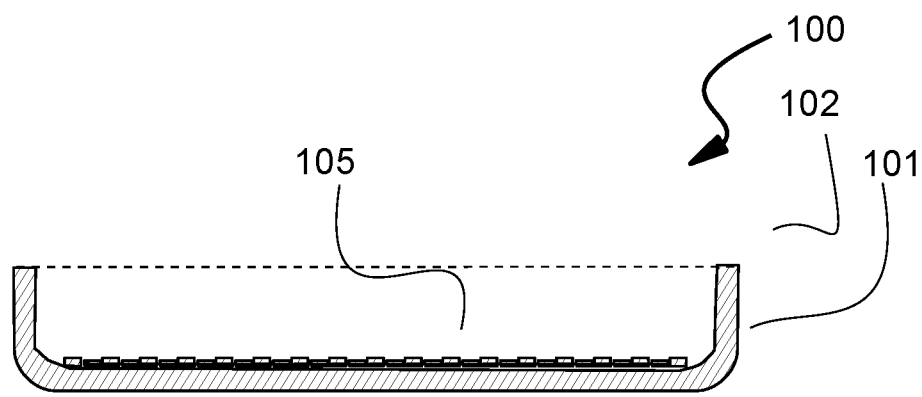
FIG. 8B is a section view thereof.

FIGS. 8A-11B illustrate alternative shapes to the bands than the concentric circles of other embodiments. While FIG. 8A show linear bands, curvilinear bands 111 may be preferred to prevent damage from the linear edge tools, implement or spatulas that may contact the intervening surface 113 or trough defining the intervening surface 113.

Figure 9A:
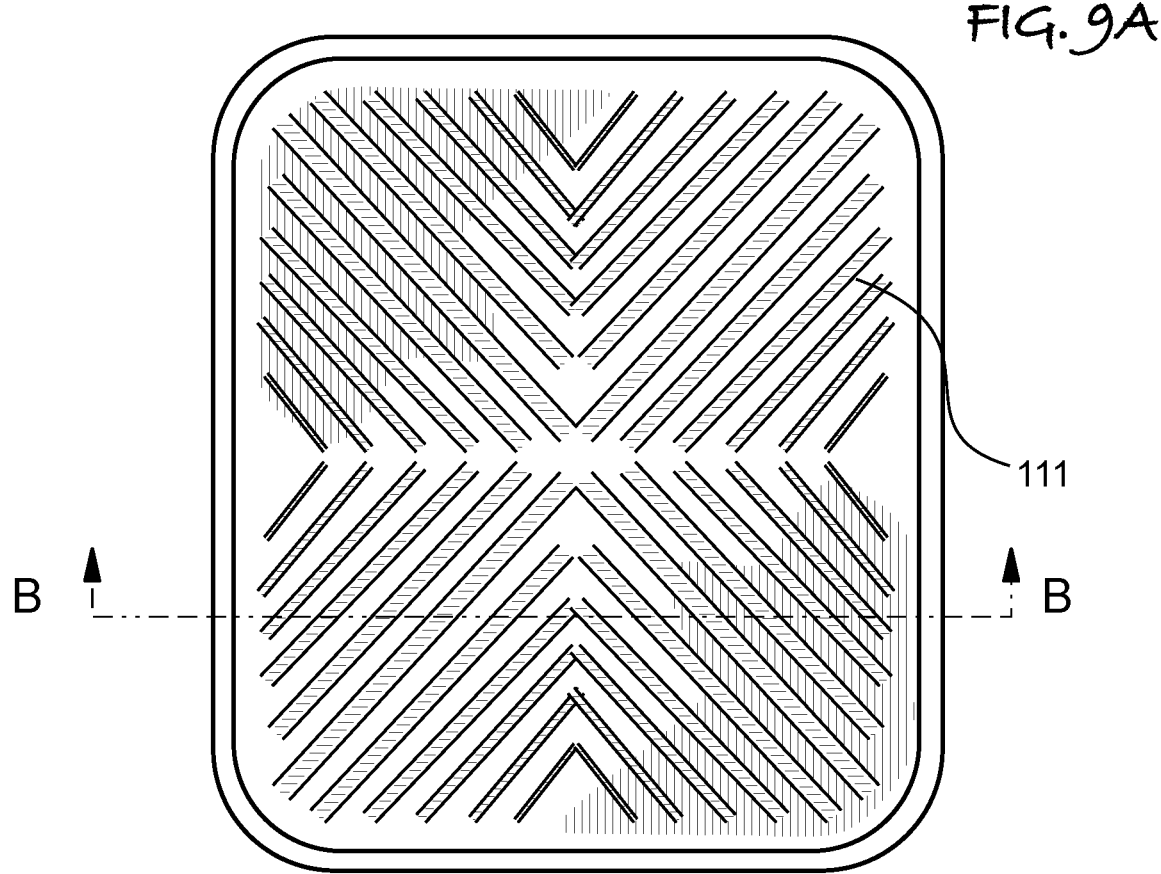
Figure 9B:
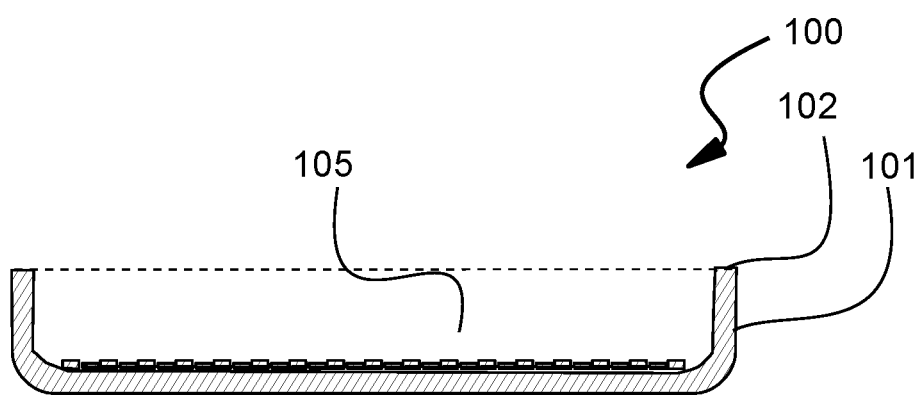
FIG. 9B is a section view thereof.

FIGS. 9A and 9B show diagonal bands 111 relative to the corner of the generally rectangular pan or vessel 100. The bands do no extend across the vessel, but sets of bands extend in the same direction within one of four quadrants to provide 4 fold symmetry about a center of the vessel 100.

Figure 10A:
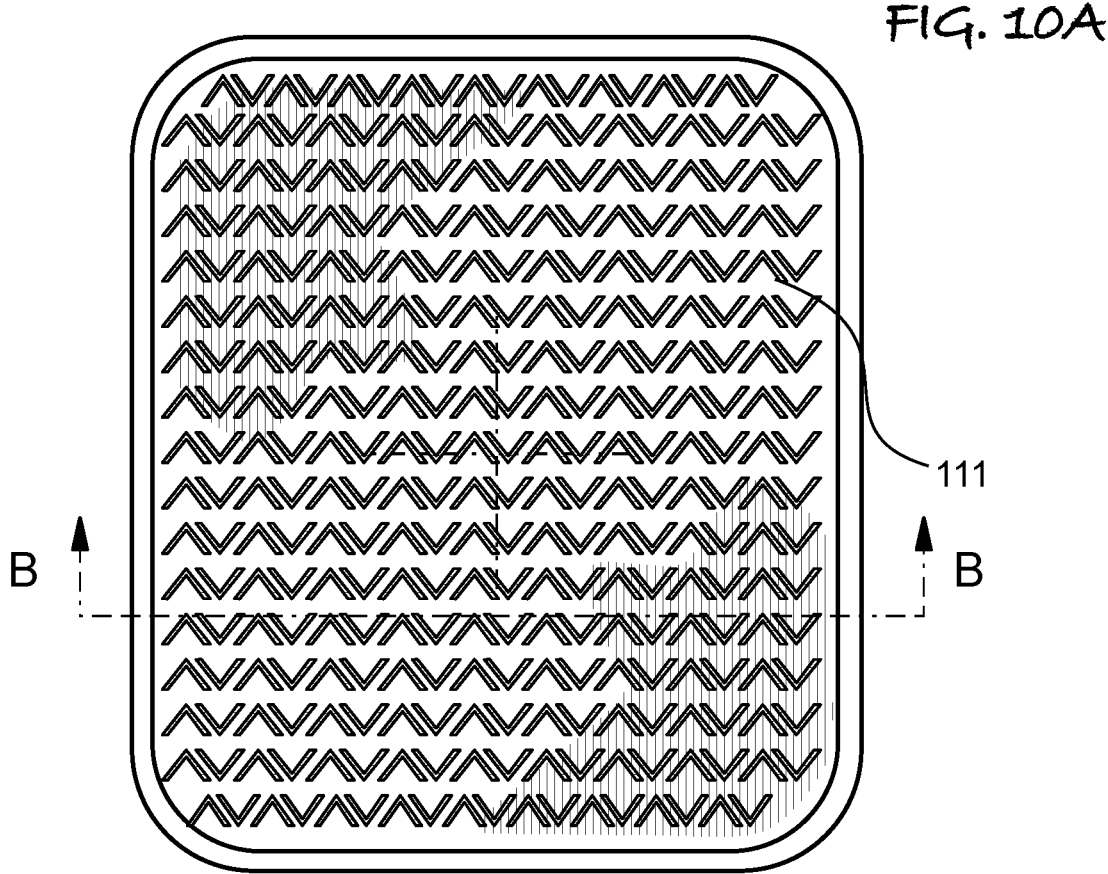
Figure 10B:
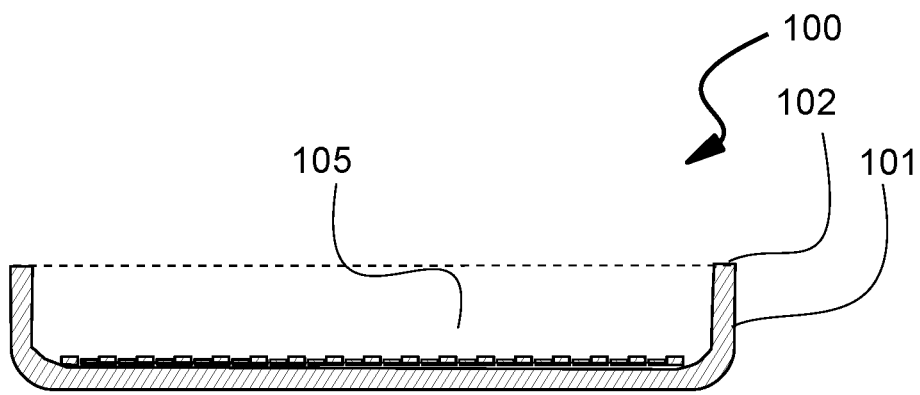
FIG. 10B is a section view thereof.

FIGS. 10A and 10B show discrete chevron shaped bands arranged in rows in which adjacent chevrons point in different directions. The raised chevron shapes represent the planarized peaks, and may be staggered to avoid line in which a cooking implement might be able to contact the non-stick coating.

Figures 11A, 11B:
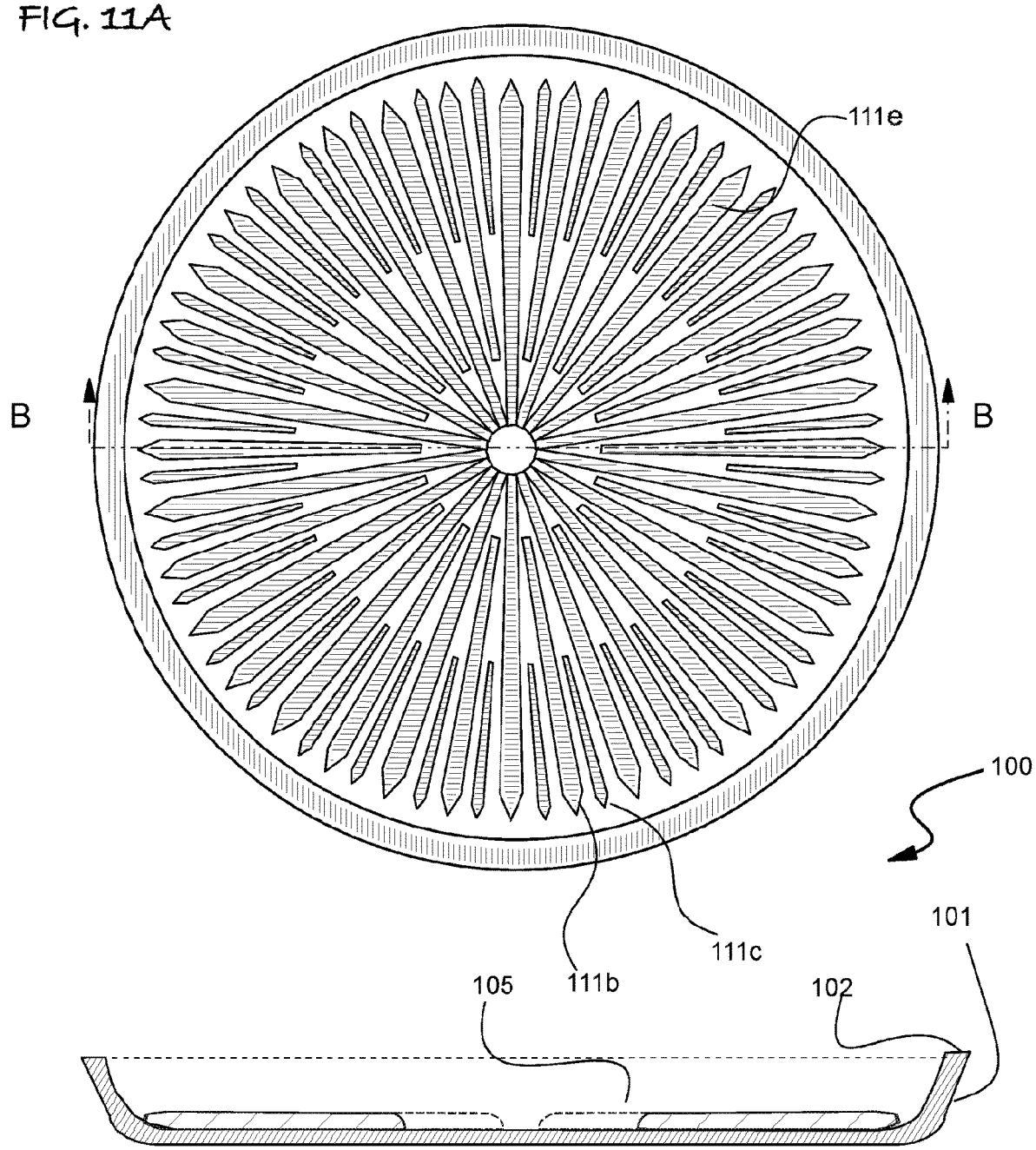

FIGS. 11A and 11B illustrate a round pan with bands that radiate in series about the center. Alternating bands such as 111*b* and 111*c* vary in length and width to fill wedge shaped regions between the longest bands 111*e*.

Figure 12A:
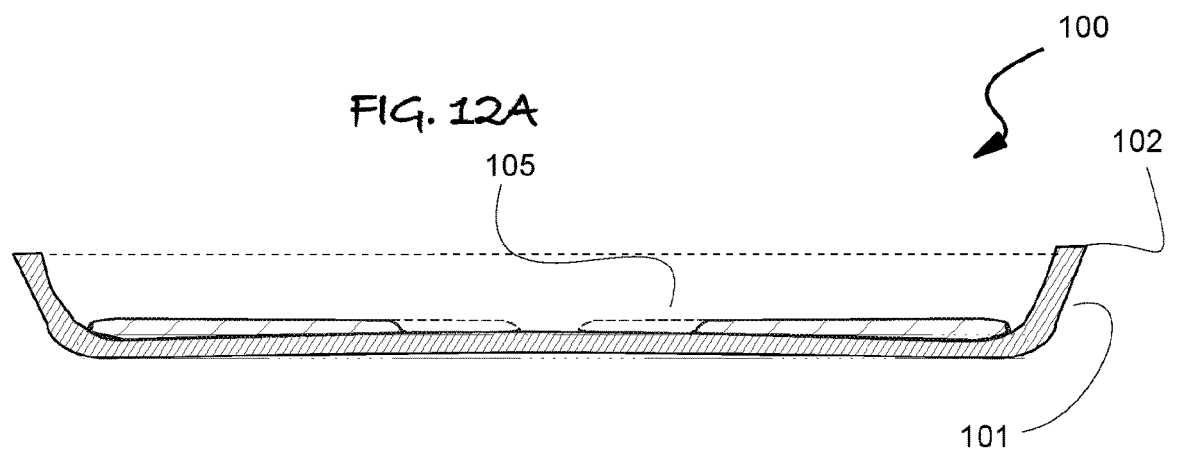
FIGS. 12A-C are cross sectional elevation views of additional alternative embodiments of the invention.
Figure 12B:
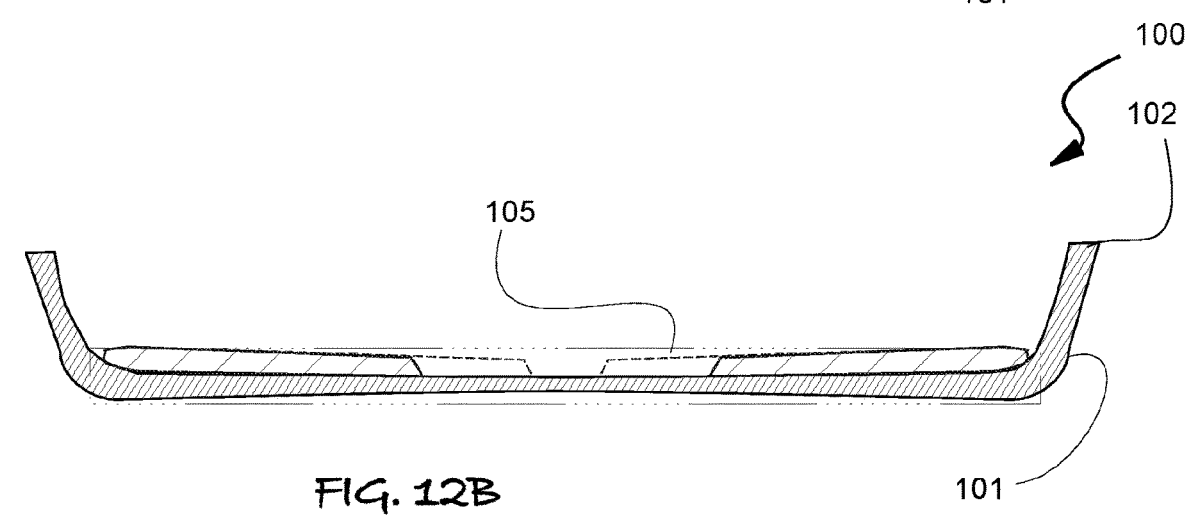
Figure 12C:
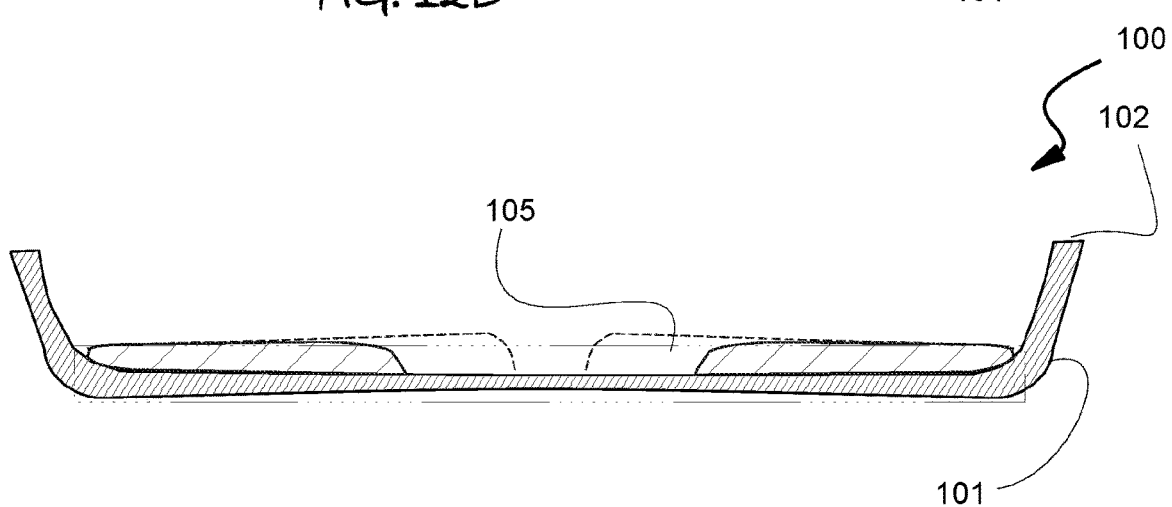

FIGS. 12A-12C illustrate how the planarization process may be varied in relation to the shape of cooking vessel body. FIG. 12A shows a cooking vessel 100 with a concave exterior lower surface so that a an outer perimeter defines a rim a circle that lies in a single plane to provide for stable resting on a table, counter or cooking surface such as a burner grate or glass platen.

If the same concave shape carries over to the inner surface of the pan, clearly any cooking oil will drain towards the periphery and not be available to transfer heat between the upper or interior cooking surface and the foodstuffs being cooked. However, even when the inner surface of the vessel is perfectly flat, being coplanar with the circle at the periphery of the outer bottom of the pan, when cooking oil is heated in the pan, the temperature gradient of the hotter center caused by the will cause oil to flow towards the periphery anyway. Accordingly, in a preferred embodiment of the invention the inner cooking surface has the opposite curvature, being concave so that hot oil will better distribute within a wider region of the cooking surface, starting at the center. A better distribution of heating oil contributes to more uniform browning of the foods by acting as a superior heat transfer agent to air. Also, the oil film may repeal water released as food cooks, since water will not heat over 100° it is desirable that it boils off distal to the food, so the foods reaches higher temperature reflective of the pan temperature. The channel, which may also be referred to as a trough or valley, between the peaks may aid in draining small amounts of released water away foods.

FIG. 12B illustrates that the elongated raised regions of the pan peaks can be planarized in the annular direction, forming a surface of revolution of a low aspect ratio cone, to provide the same concave inward slope is the interior surface. This can be achieved by a rotary abrasion tool that has circular symmetry matching the shape of the portion of the peak or planar regions shown in FIG. 12B.

FIG. 12C illustrates that it is also possible to provide the opposite curvature in the radial direction in which the peaks or planar regions 111 have a higher height relative to the interior cooking surface covered with the nonstick coating toward the center of the pan than the perimeter regions distal from the center. To the extent the metal or ceramic surface of the planar regions have grooves 115 that retain cooking oil, it may be possible to control the amount of cooking oil food can absorb by as the planar regions 111 support the food stuff above a central pool of oil.

Figure 13A:
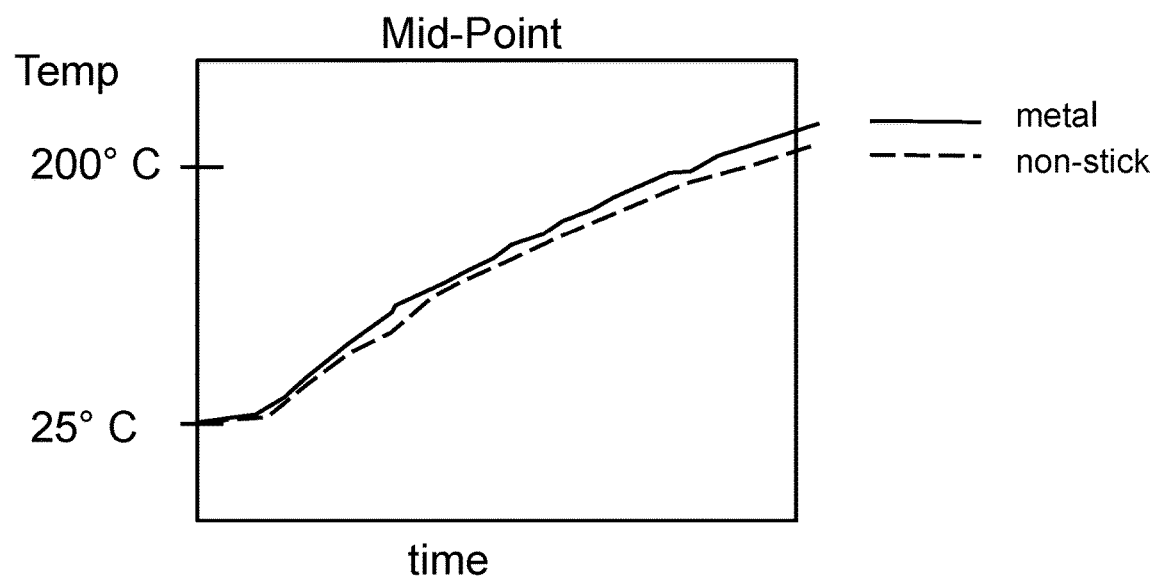
FIGS. 13A and 13B compare the temperature changes by location as an embodiment of the invention is heated on an induction burner.
Figure 13B:
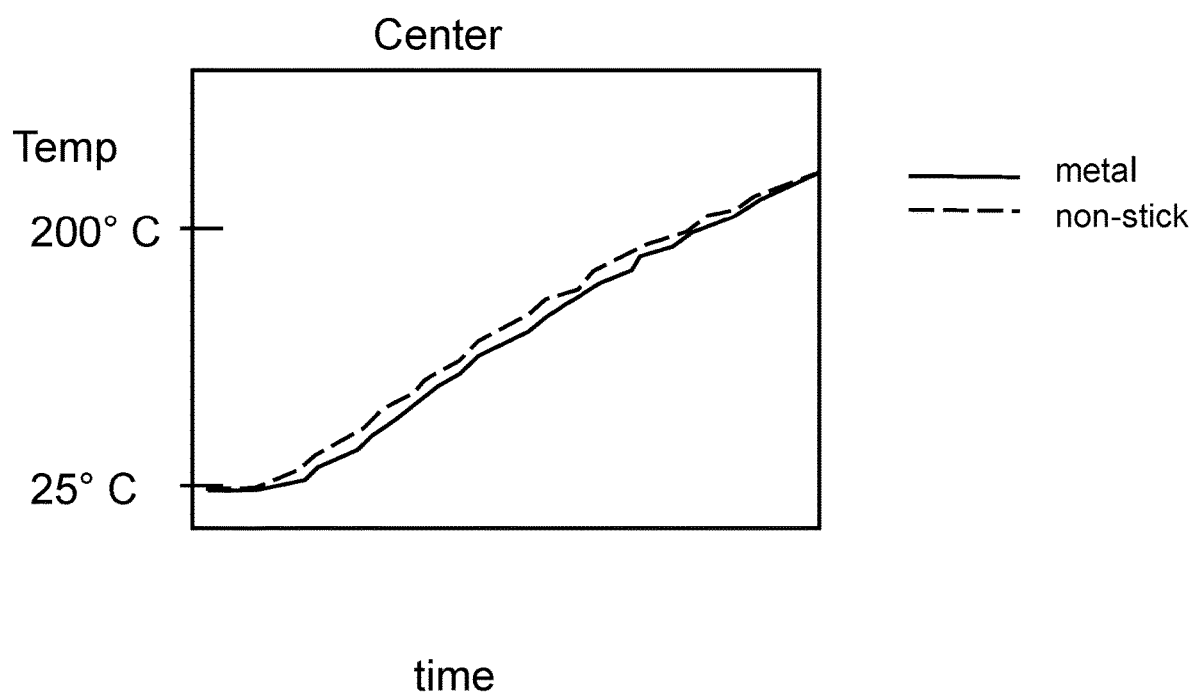

FIGS. 13A and 13B include a graph showing the difference in temperature as a pan is heated on an induction burner base at a midpoint between the pan center and the sidewalk to compare the heating rate of the exposed metal peaks with the troughs covered in the nonstick coating. Even flat pans exhibit this tendency.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. An article of cookware, comprising:
    a surface for supporting foodstuffs during cooking, the surface comprising
    a first region defined by a plurality of planar bands of a first material, the planar bands spaced apart from each other by at least a first distance, and
    a second region defined by a plurality of intervening channels between the planar bands, the intervening channels having surfaces disposed below an upper surface of immediately adjacent planar bands and an outer surface of a second material with a lower surface energy than an outer surface of the first region.

2. The article of cookware according to claim 1, wherein the first material is one of a metal, a metal alloy, a metal compound, or a ceramic compound.

3. The article of cookware according to claim 2, wherein the second material is a non-stick coating that comprises one of fluoro-polymers, silicones, or fluoro-silicones.

4. The article of cookware according to claim 1, wherein the second material is a non-stick coating comprising one of fluoro-polymers, silicones, or fluoro-silicones.

5. The article of cookware according to claim 1, wherein the surface of the intervening channels have curvilinear shape transverse to a principal axis of the planar bands of the first region.

6. The article of cookware according to claim 1, further comprising a third region defined by a plurality of intervening surfaces between each of the first regions and second regions which comprises intervening planar bands disposed at about a same height as the planar bands of the first region in which the outer surface of the intervening planar bands comprises the second material.

7. The article of cookware according to claim 6, wherein the intervening planar bands are narrower than the planar bands of the first region.

8. The article of cookware according to claim 1, wherein the planar bands of the first region have a width of at least about 2.5 to 4.5 mm.

9. The article of cookware according to claim 1, wherein the intervening channels have a width of at least about 0.5 to 2 mm.

10. The article of cookware according to claim 1, wherein the planar bands have an elongated curvilinear shape.

11. The article of cookware according to claim 1, further comprising an upward extending sidewall that surrounds the surface for supporting foodstuffs.

12. The article of cookware according to claim 1, wherein the planar bands have an elongated curvilinear shape and are circular, each planar band forming a concentrically aligned annular ring with respect to the other planar bands in the plurality of planar bands.

13. The article of cookware according to claim 1, wherein the article of cookware has a base material and the surface for supporting foods stuffs is above the base material.

14. The article of cookware according to claim 13, wherein the base material is selected from the group consisting of aluminum, stainless steel, cast iron and ceramic materials.

15. The article of cookware according to claim 1, wherein the intervening surfaces are disposed slightly lower than an upper surface of the immediately adjacent bands and have a convex shape.

* * * * *